US010148513B1

(12) United States Patent
Narayanam et al.

(10) Patent No.: US 10,148,513 B1
(45) Date of Patent: Dec. 4, 2018

(54) MOBILE DEVICE BANDWIDTH CONSUMPTION

(71) Applicant: INTERNATIONAL BUSINESS MACHINES CORPORATION, Armonk, NY (US)

(72) Inventors: Krishnasuri Narayanam, Bangalore (IN); Ramasuri Narayanam, Guntur (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/591,641

(22) Filed: May 10, 2017

(51) Int. Cl.
| | |
|---|---|
| H04W 28/20 | (2009.01) |
| H04L 12/24 | (2006.01) |
| H04B 7/04 | (2017.01) |
| H04W 64/00 | (2009.01) |
| H04W 16/28 | (2009.01) |

(52) U.S. Cl.
CPC .......... *H04L 41/0896* (2013.01); *H04B 7/04* (2013.01); *H04W 16/28* (2013.01); *H04W 28/20* (2013.01); *H04W 64/00* (2013.01)

(58) Field of Classification Search
CPC ...... H04L 41/0896; H04B 7/04; H04W 16/28; H04W 28/20; H04W 64/00
USPC ...................................................... 455/562.1
See application file for complete search history.

(56) References Cited

U.S. PATENT DOCUMENTS

| | | | | |
|---|---|---|---|---|
| 5,767,804 A | * | 6/1998 | Murphy ................ | G01S 5/0036 342/357.31 |
| 5,771,017 A | * | 6/1998 | Dean ...................... | H01Q 1/246 342/374 |
| 5,828,337 A | * | 10/1998 | Aoshima .............. | H01Q 1/3275 342/359 |
| 5,856,804 A | * | 1/1999 | Turcotte .................... | G01S 3/42 342/371 |
| 6,289,005 B1 | * | 9/2001 | Katz ........................ | H01Q 3/24 370/328 |
| 6,311,075 B1 | * | 10/2001 | Bevan .................... | H01Q 1/246 342/368 |
| 6,393,303 B1 | * | 5/2002 | Katz .................... | H04B 7/0615 342/359 |

(Continued)

FOREIGN PATENT DOCUMENTS

WO     2007028077     3/2007

*Primary Examiner* — Hai V Nguyen
(74) *Attorney, Agent, or Firm* — Schmeiser, Olsen & Watts; Mark C. Vallone

(57) ABSTRACT

A method and system for improving mobile bandwidth consumption is provided. The method includes establishing a wireless connection between a mobile device and a first antenna of a wireless connection device located within a specified geographical zone. Movement of the mobile device is tracked within the specified geographical zone and it is determined that the mobile device has exited a first subzone of the specified geographical zone. Additionally, it is determined that that the mobile device has entered a second subzone of the specified geographical zone. In response, communications between the mobile device and the wireless connection device via the first antenna are disabled. Additionally, communications between the mobile device and the wireless connection device via a second antenna of the wireless connection device are enabled.

17 Claims, 7 Drawing Sheets

(56) References Cited

U.S. PATENT DOCUMENTS

| | | | | |
|---|---|---|---|---|
| 6,438,376 B1* | 8/2002 | Elliott | H04W 36/32 | 455/437 |
| 6,615,134 B2* | 9/2003 | Ando | G08G 1/20 | 455/510 |
| 6,970,708 B1* | 11/2005 | Raith | H04L 1/20 | 455/440 |
| 7,014,124 B2* | 3/2006 | Gottlieb | F24F 11/006 | 165/205 |
| 7,035,650 B1* | 4/2006 | Moskowitz | G01C 21/20 | 340/995.23 |
| 7,062,296 B2* | 6/2006 | Brennan | H04B 7/04 | 455/561 |
| 7,139,324 B1* | 11/2006 | Ylitalo | H04B 7/0634 | 375/267 |
| 7,363,041 B2* | 4/2008 | Bonnard | H04W 8/183 | 455/404.2 |
| 7,430,181 B1* | 9/2008 | Hong | H04W 12/04 | 370/254 |
| 7,729,728 B2* | 6/2010 | Brennan | H04B 7/04 | 455/561 |
| 7,835,762 B2* | 11/2010 | Sendonaris | H04W 52/283 | 455/456.1 |
| 8,019,352 B2* | 9/2011 | Rappaport | H04W 64/00 | 340/988 |
| 8,130,104 B1* | 3/2012 | Braiman | G07C 9/00111 | 340/572.1 |
| 8,155,081 B1* | 4/2012 | Mater | H04W 4/04 | 370/254 |
| 8,295,823 B2* | 10/2012 | Nakajima | H04M 1/72577 | 455/419 |
| 8,311,482 B2* | 11/2012 | Jin | H04W 16/28 | 455/446 |
| 8,385,844 B2* | 2/2013 | Nandagopalan | H01Q 3/30 | 455/562.1 |
| 8,412,106 B2* | 4/2013 | da Silva | H04B 7/04 | 455/63.4 |
| 8,430,310 B1* | 4/2013 | Ho | G06F 21/35 | 235/382 |
| 8,487,772 B1* | 7/2013 | Higgins | G06Q 30/0201 | 340/573.1 |
| 8,543,116 B2* | 9/2013 | Zhang | H04W 52/0258 | 455/436 |
| 8,630,277 B1* | 1/2014 | Mater | H04W 4/04 | 370/331 |
| 8,681,753 B2* | 3/2014 | Kokkinen | B61L 15/0027 | 370/328 |
| 8,964,595 B2* | 2/2015 | Agarwal | H04W 24/08 | 370/252 |
| 8,989,147 B1* | 3/2015 | Mater | H04W 4/04 | 370/331 |
| 9,078,217 B2* | 7/2015 | Ishii | H04W 52/146 | |
| 9,107,132 B2* | 8/2015 | Kowshik | H04W 36/245 | |
| 9,173,187 B2* | 10/2015 | Moshfeghi | H04W 4/029 | |
| 9,438,496 B2* | 9/2016 | Raman | H04L 43/10 | |
| 9,445,334 B2* | 9/2016 | Tinnakornsrisuphap | H04W 36/22 | |
| 9,462,589 B2* | 10/2016 | Da Silva | H04B 7/04 | |
| 9,483,934 B2* | 11/2016 | Kotlicki | G08C 17/02 | |
| 9,503,972 B2* | 11/2016 | Zhang | H04W 52/0258 | |
| 9,526,058 B2* | 12/2016 | Kakkad | H04W 36/30 | |
| 9,549,411 B2* | 1/2017 | Miao | H04W 76/14 | |
| 9,607,285 B1* | 3/2017 | Wellman | G06Q 10/087 | |
| 9,648,537 B2* | 5/2017 | Tan | H04W 36/30 | |
| 9,648,557 B2* | 5/2017 | Sengupta | H04W 36/24 | |
| 9,680,704 B2* | 6/2017 | Pera | H04L 41/0813 | |
| 9,681,358 B2* | 6/2017 | Juhasz | H04W 48/02 | |
| 9,697,656 B2* | 7/2017 | Trani | G07C 9/00007 | |
| 9,706,413 B2* | 7/2017 | Ahmed | H04W 4/04 | |
| 9,712,963 B2* | 7/2017 | Kim | H04W 4/023 | |
| 9,775,063 B2* | 9/2017 | Siomina | G01S 5/0205 | |
| 9,788,268 B2* | 10/2017 | Maeda | H04W 48/20 | |
| 9,865,144 B2* | 1/2018 | Trani | G08B 13/19695 | |
| 9,888,393 B2* | 2/2018 | Maggenti | H04L 41/0806 | |
| 2002/0085514 A1* | 7/2002 | Illidge | H04J 13/00 | 370/329 |
| 2002/0137562 A1* | 9/2002 | Malone | G07F 17/32 | 463/19 |
| 2002/0173907 A1* | 11/2002 | Ando | G08G 1/20 | 701/410 |
| 2003/0146871 A1* | 8/2003 | Karr | G01S 1/026 | 342/457 |
| 2004/0132462 A1* | 7/2004 | Bonnard | H04W 8/183 | 455/456.1 |
| 2005/0078006 A1* | 4/2005 | Hutchins | G07C 9/00111 | 340/561 |
| 2005/0127196 A1* | 6/2005 | Gottlieb | G05D 7/0676 | 236/51 |
| 2006/0019679 A1* | 1/2006 | Rappaport | G01S 5/0252 | 455/456.5 |
| 2006/0262004 A1* | 11/2006 | Buck | G01S 13/89 | 342/25 A |
| 2007/0054617 A1* | 3/2007 | Nikolajevic | H04B 7/0619 | 455/41.2 |
| 2008/0090520 A1* | 4/2008 | Camp | H04B 5/00 | 455/41.2 |
| 2008/0113785 A1* | 5/2008 | Alderucci | G06F 21/32 | 463/29 |
| 2008/0143518 A1* | 6/2008 | Aaron | H04M 1/72569 | 340/540 |
| 2008/0180228 A1* | 7/2008 | Wakefield | G01S 5/0252 | 340/4.62 |
| 2009/0080348 A1* | 3/2009 | Hamel | A61B 1/00016 | 370/310 |
| 2009/0219900 A1* | 9/2009 | Kokkinen | B61L 15/0027 | 370/338 |
| 2009/0253438 A1* | 10/2009 | Chater-Lea | H01Q 1/242 | 455/456.1 |
| 2010/0094482 A1* | 4/2010 | Schofield | G08G 1/205 | 701/2 |
| 2010/0234071 A1* | 9/2010 | Shabtay | H04B 7/0408 | 455/562.1 |
| 2010/0255858 A1* | 10/2010 | Juhasz | H04W 48/02 | 455/456.4 |
| 2010/0279616 A1* | 11/2010 | Jin | H04W 16/28 | 455/62 |
| 2011/0009056 A1* | 1/2011 | Hanson | H04B 7/15535 | 455/9 |
| 2011/0059688 A1* | 3/2011 | Noonan | H04W 8/005 | 455/1 |
| 2011/0105155 A1* | 5/2011 | Bienas | H04W 68/02 | 455/458 |
| 2011/0143673 A1* | 6/2011 | Landesman | H01Q 1/1257 | 455/63.1 |
| 2011/0261777 A1* | 10/2011 | Maeda | H04W 48/20 | 370/329 |
| 2011/0309933 A1* | 12/2011 | Marino | G01S 5/0252 | 340/539.32 |
| 2012/0108211 A1* | 5/2012 | Nakajima | H04M 1/72577 | 455/411 |
| 2012/0129565 A1* | 5/2012 | Frost | H04B 7/022 | 455/522 |
| 2012/0154115 A1* | 6/2012 | Herrala | G07C 9/00111 | 340/5.64 |
| 2012/0225673 A1* | 9/2012 | Juhasz | H04W 48/02 | 455/456.4 |
| 2012/0280783 A1* | 11/2012 | Gerhardt | G07C 9/00309 | 340/5.6 |
| 2013/0099927 A1* | 4/2013 | Kulinets | G01S 5/0009 | 340/572.1 |
| 2013/0149991 A1* | 6/2013 | Hepo-Oja | G01S 1/14 | 455/404.2 |
| 2013/0150044 A1* | 6/2013 | Zhang | H04W 52/0258 | 455/436 |
| 2014/0015978 A1* | 1/2014 | Smith | G07B 15/02 | 348/156 |
| 2014/0050135 A1* | 2/2014 | Zhang | H04W 52/0258 | 370/311 |
| 2014/0077929 A1* | 3/2014 | Dumas | G07C 9/00571 | 340/5.61 |

(56) References Cited

U.S. PATENT DOCUMENTS

| | | | | |
|---|---|---|---|---|
| 2014/0176310 A1* | 6/2014 | Kotlicki | G08C 17/02 | 340/12.5 |
| 2014/0233458 A1* | 8/2014 | Georgescu | H04W 4/08 | 370/328 |
| 2014/0253326 A1* | 9/2014 | Cho | G08B 25/10 | 340/539.13 |
| 2014/0266585 A1* | 9/2014 | Chao | G07C 9/00111 | 340/5.61 |
| 2014/0274135 A1* | 9/2014 | Edge | H04W 4/021 | 455/456.2 |
| 2014/0289284 A1* | 9/2014 | Patterson | G06F 17/30241 | 707/805 |
| 2015/0071274 A1* | 3/2015 | Sugar | H04W 4/02 | 370/338 |
| 2015/0085725 A1* | 3/2015 | Estevez | H04W 52/0206 | 370/311 |
| 2015/0348220 A1* | 12/2015 | Sharma | G06Q 50/265 | 705/324 |
| 2016/0161923 A1* | 6/2016 | Li | G04R 20/14 | 368/47 |
| 2016/0183180 A1* | 6/2016 | Garcia Martin | H04W 48/18 | 370/328 |
| 2016/0192209 A1* | 6/2016 | Rumreich | H04W 16/28 | 455/562.1 |
| 2016/0278064 A1* | 9/2016 | Marsh | H04W 72/046 | |
| 2016/0284147 A1* | 9/2016 | Trani | G01S 5/00 | |
| 2016/0284183 A1* | 9/2016 | Trani | G07C 9/00007 | |
| 2016/0343187 A1* | 11/2016 | Trani | G07C 9/00119 | |
| 2016/0353450 A1* | 12/2016 | Miao | H04W 76/14 | |
| 2017/0064713 A1* | 3/2017 | Barriac | H04W 72/0453 | |
| 2017/0091435 A1* | 3/2017 | Alderucci | G06F 21/31 | |
| 2017/0124289 A1* | 5/2017 | Hasan | G06F 19/3481 | |
| 2017/0142597 A1* | 5/2017 | MacDonald | H04W 24/08 | |
| 2017/0194706 A1* | 7/2017 | Lee | H04B 7/0617 | |
| 2017/0195893 A1* | 7/2017 | Lee | H04W 16/28 | |
| 2017/0256107 A1* | 9/2017 | Trani | G07C 9/00007 | |
| 2017/0290034 A1* | 10/2017 | Desai | H04W 4/029 | |
| 2017/0338883 A1* | 11/2017 | Clarke | H04B 7/15 | |

* cited by examiner

MOBILE DEVICE BANDWIDTH CONSUMPTION

FIELD

The present invention relates generally to a method for enabling location specific wireless communications and in particular to a method and associated system for improving mobile bandwidth consumption by automatically controlling a direction of directional antennae to enable specified boundaries for wireless communications.

BACKGROUND

Accurately enabling efficient communications between devices typically includes an inaccurate process with little flexibility. Selecting communication areas for efficiency may include a complicated process that may be time consuming and require a large amount of resources. Accordingly, there exists a need in the art to overcome at least some of the deficiencies and limitations described herein above.

SUMMARY

A first aspect of the invention provides a mobile bandwidth consumption improvement method comprising: establishing, by a processor of a mobile device located within a specified geographical zone, a wireless connection between the mobile device and a first antenna of a wireless connection device located within the specified geographical zone, wherein the mobile device comprises an antenna detection circuit, and wherein the wireless connection device comprises a plurality of directional antennas each pointing towards a different direction, and wherein the plurality of directional antennas comprise the first antenna; tracking, by the processor via the antenna detection circuit, movement of the mobile device within the specified geographical zone; first determining, by the processor based on results of the tracking, that the mobile device has exited a first subzone of the specified geographical zone, wherein the first subzone is associated with communications with the wireless connection device via the first antenna; second determining, by the processor based on results of the tracking, that the mobile device has entered a second subzone of the specified geographical zone, wherein the second subzone is associated with communications with the wireless connection device via a second antenna of the plurality of directional antennas; disabling, by the processor based on results of the first determining, communications between the mobile device and the wireless connection device via the first antenna; and enabling, by the processor based on results of the second determining, communications between the mobile device and the wireless connection device via the second antenna.

A second aspect of the invention provides a computer program product, comprising a computer readable hardware storage device storing a computer readable program code, the computer readable program code comprising an algorithm that when executed by a processor of a mobile device implements a mobile bandwidth consumption improvement method, the method comprising: establishing, by the processor of the mobile device located within a specified geographical zone, a wireless connection between the mobile device and a first antenna of a wireless connection device located within the specified geographical zone, wherein the mobile device comprises an antenna detection circuit, and wherein the wireless connection device comprises a plurality of directional antennas each pointing towards a different direction, and wherein the plurality of directional antennas comprise the first antenna; tracking, by the processor via the antenna detection circuit, movement of the mobile device within the specified geographical zone; first determining, by the processor based on results of the tracking, that the mobile device has exited a first subzone of the specified geographical zone, wherein the first subzone is associated with communications with the wireless connection device via the first antenna; second determining, by the processor based on results of the tracking, that the mobile device has entered a second subzone of the specified geographical zone, wherein the second subzone is associated with communications with the wireless connection device via a second antenna of the plurality of directional antennas; disabling, by the processor based on results of the first determining, communications between the mobile device and the wireless connection device via the first antenna; and enabling, by the processor based on results of the second determining, communications between the mobile device and the wireless connection device via the second antenna.

A third aspect of the invention provides a mobile device comprising a processor coupled to a computer-readable memory unit, the memory unit comprising instructions that when executed by the computer processor implements a mobile bandwidth consumption improvement method comprising: establishing, by the processor of the mobile device located within a specified geographical zone, a wireless connection between the mobile device and a first antenna of a wireless connection device located within the specified geographical zone, wherein the mobile device comprises an antenna detection circuit, and wherein the wireless connection device comprises a plurality of directional antennas each pointing towards a different direction, and wherein the plurality of directional antennas comprise the first antenna; tracking, by the processor via the antenna detection circuit, movement of the mobile device within the specified geographical zone; first determining, by the processor based on results of the tracking, that the mobile device has exited a first subzone of the specified geographical zone, wherein the first subzone is associated with communications with the wireless connection device via the first antenna; second determining, by the processor based on results of the tracking, that the mobile device has entered a second subzone of the specified geographical zone, wherein the second subzone is associated with communications with the wireless connection device via a second antenna of the plurality of directional antennas; disabling, by the processor based on results of the first determining, communications between the mobile device and the wireless connection device via the first antenna; and enabling, by the processor based on results of the second determining, communications between the mobile device and the wireless connection device via the second antenna.

The present invention advantageously provides a simple method and associated system capable of accurately enabling efficient communications between devices.

DETAILED DESCRIPTION

Figure 1:
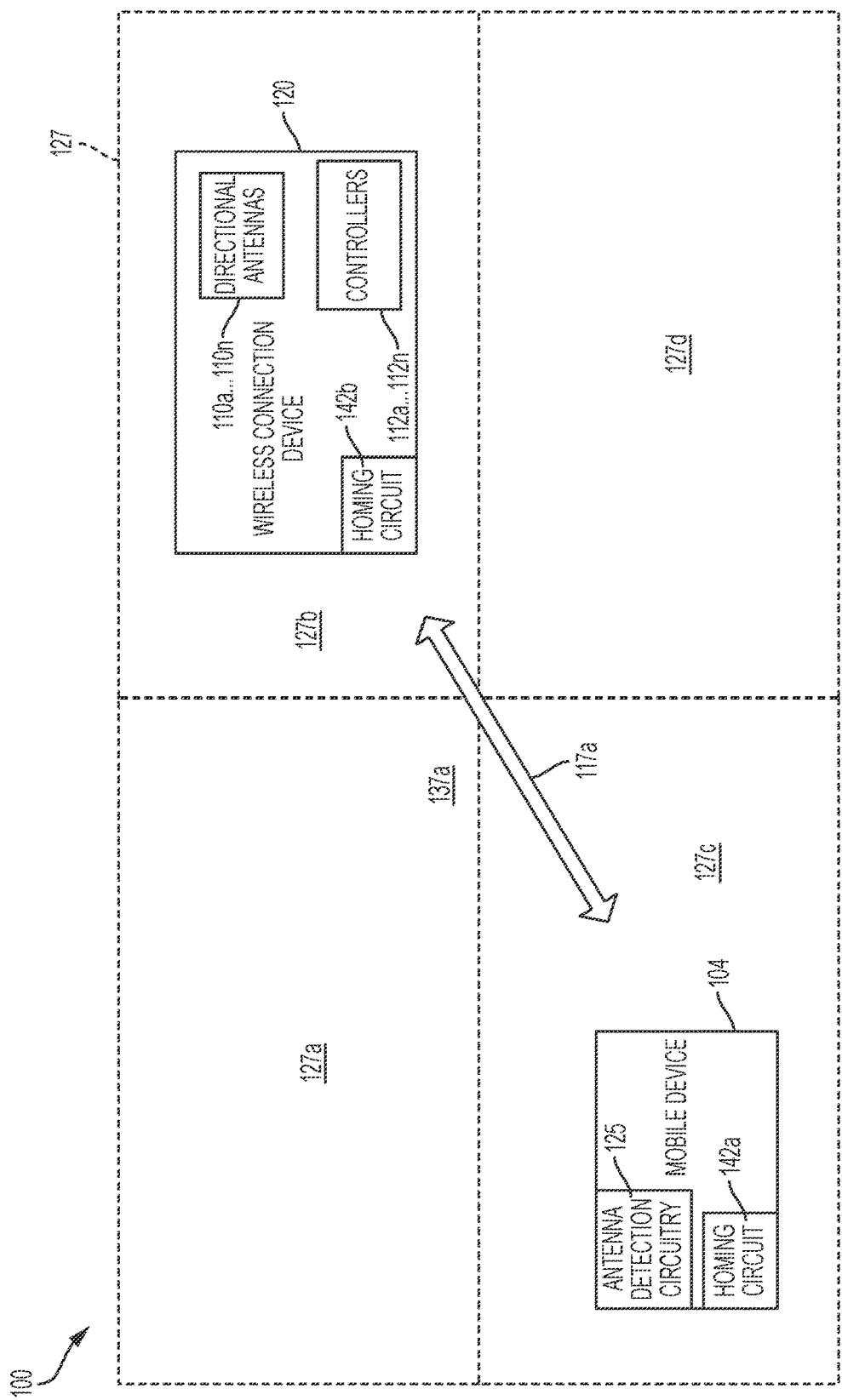
FIG. 1 illustrates a system for improving mobile bandwidth consumption by automatically controlling a direction of directional antennas to enable specified boundaries for wireless communications, in accordance with embodiments of the present invention.

FIG. 1 illustrates a system 100 for improving mobile bandwidth consumption by automatically controlling a direction of directional antennas to enable specified boundaries for wireless communications, in accordance with embodiments of the present invention. System 100 enables a process for enabling a beamed wireless signal from multiple micro-electro-mechanical (MEMS) systems directional antennae in a Wi-Fi device to restrict a range of signal detection and transmission to physical boundaries of a geographical space such as, inter alia, a building, a room, a car, a bus, an aircraft, etc. System 100 executes a process that includes:

1. Tracking movement of a connected mobile device within a specified the physical space and automatically handing over a connection to an adjacent antenna when the connected mobile device is detected within a region associated with communications for the adjacent antenna.
2. Enabling a user to move a mobile device to another location to connect to an alternative wireless signal upon detecting a presence of a communications blind zone. Additionally, the mobile device may be relocated back to the previous position such that an initial wireless signal free zone is served by an antenna that has been moved by a slight angle in azimuth or elevation to provide wireless communications coverage. Alternatively, an angle of wireless coverage may be increased by enabling a reflector located behind the MEMS system antenna to enable wireless communications with the blind spot as the user relocates the connected wireless beam back to an original position with no initial coverage.

System 100 of FIG. 1 includes a mobile device 104 (i.e., specialized hardware device) and a wireless connection device 120 interconnected through a wireless signal 117a. Mobile device 104 includes specialized antenna detection circuitry 125 that may include specialized software. Wireless connection device 120 includes multiple directional antennas 110a . . . 110n and associated controllers (circuitry) 112 . . . 112n for automatically moving the multiple directional antennas 110a . . . 110n in any direction based on a wireless signal need. Each of multiple directional antennas 110a . . . 110n may comprise a motor for moving an antenna in any direction. Alternatively or additionally each of multiple directional antennas 110a . . . 110n may comprise an associated electronic switch (e.g., a relay) for disabling a signal path to an associated directional antenna. Mobile device 104 and wireless connection device 120 may be located within a specified geographical location/structure (or zone) 127 (e.g., a building, a room, etc.). Specified geographical location/structure 127 is divided into sub-zones 127a . . . 127d to prevent signal spill over to other subzones that may be accessible by others. Additionally, specified geographical location/structure 127 is divided into sub-zones 127a . . . 127d to reduce a size of each communication zone thereby reducing a number of devices that may connect to wireless connection device 120 resulting in a reduction of bandwidth consumption thereby increasing a network speed. Each of sub-zones 127a . . . 127d is associated with a different antenna of the multiple directional antennas 110a . . . 110n. Additionally, mobile device 104 and wireless connection device 120 may each include additional sensor devices for detecting sub-zones 127a . . . 127d. For example, mobile device 104 and wireless connection device 120 may comprise optical sensors, RFID sensors, GPS sensors, etc. Mobile device 104 may comprise any type of mobile including, inter alia, a smart phone, a smart watch, an activity tracker, a computer, etc. Wireless connection device 120 may include any type of wireless Wi-Fi device including a modem and/or a router. Mobile device 104 and wireless connection device 120 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, mobile device 104 and wireless connection device 120 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving mobile bandwidth consumption by automatically controlling a direction of directional antennas to enable specified boundaries for wireless communications.

Wireless connection device 120 multiple directional antennas 110a . . . 110n enabled to be configured with respect to signal direction and signal strength such that wireless connection device 120 may configure a shape of a Wi-Fi cloud (e.g., one of sub-zones 127a . . . 127n) by modifying the signal strengths and/or directions. A homing circuit (within controllers 112 . . . 112n and/or antenna detection circuitry 125) is enabled to detect (via signal variation) movement of mobile device 104. In response, a control signal is enabled for allowing wireless connection device 120 to automatically control connections to any of directional antennas 110a . . . 110n based on the movement of mobile device 104. Alternatively, an external homing device 142a or 142b (e.g., a USB connectable device) may be connected to wireless connection device 120 and/or mobile device 104 to maintain a signal direction focus thereby enabling a directional signal beam for connection to wireless connection device 120 as user moves with mobile device 104. The directional signal beam may switch between any of directional antennas 110a . . . 110n thereby minimizing a signal beam spread resulting in a reduction of unauthorized signal (network) usage and optimized bandwidth usage across a network. Additionally, mobile device 104 battery power consumption may be reduced by routing connections to wireless connection device 120 instead of a cellular phone tower.

The following implementation example describe a process for automatically controlling a direction of directional antennas 110a . . . 110n to enable specified wireless boundaries or sub-zones:

A user executes an application (via mobile device 104) for defining a directional wireless signal range within geographical location/structure 127 with respect to a position or placement of wireless connection device 120. The defined a directional wireless signal range may be presented to the user via a GUI of mobile device 104 and/or wireless connection device 120. As mobile device 104 is travels towards any wireless signal beams (transmitted via directional antennas 110a . . . 110n) in any of sub-zones 127a . . . 127d, a handshaking and connection process is executed. If an externally connected homing device (e.g., externally connected homing device 142a or 142b) is used (i.e., as described supra), then the externally connected homing device is automatically connected to a single antenna (of directional antennas 110a . . . 110n) of wireless connection device 120 as mobile device 104 travels throughout geographical location/structure 127. Additional wireless signal beams adjacent to an active wireless signal beam are enabled to listen and detect directional movement of mobile device 104 thereby tracking the movement of mobile device 104. Additional wireless signal beams that are not adjacent to the active wireless signal beam may be disabled. If detected movement of mobile device 104 is such that another wireless signal beams is determined to comprise a stronger signal strength, then another handshaking and connection process is executed to connect mobile device 104 to another antenna of directional antennas 110a . . . 110n. For example in FIG. 1, mobile device 104 is determined to be located in sub-zone 127c. Therefore, a wireless signal beam is routed to a first specified antenna of directional antennas 110a . . . 110n for communications and all other antennas of directional antennas 110a . . . 110n may be disabled or disconnected.

Figure 2:
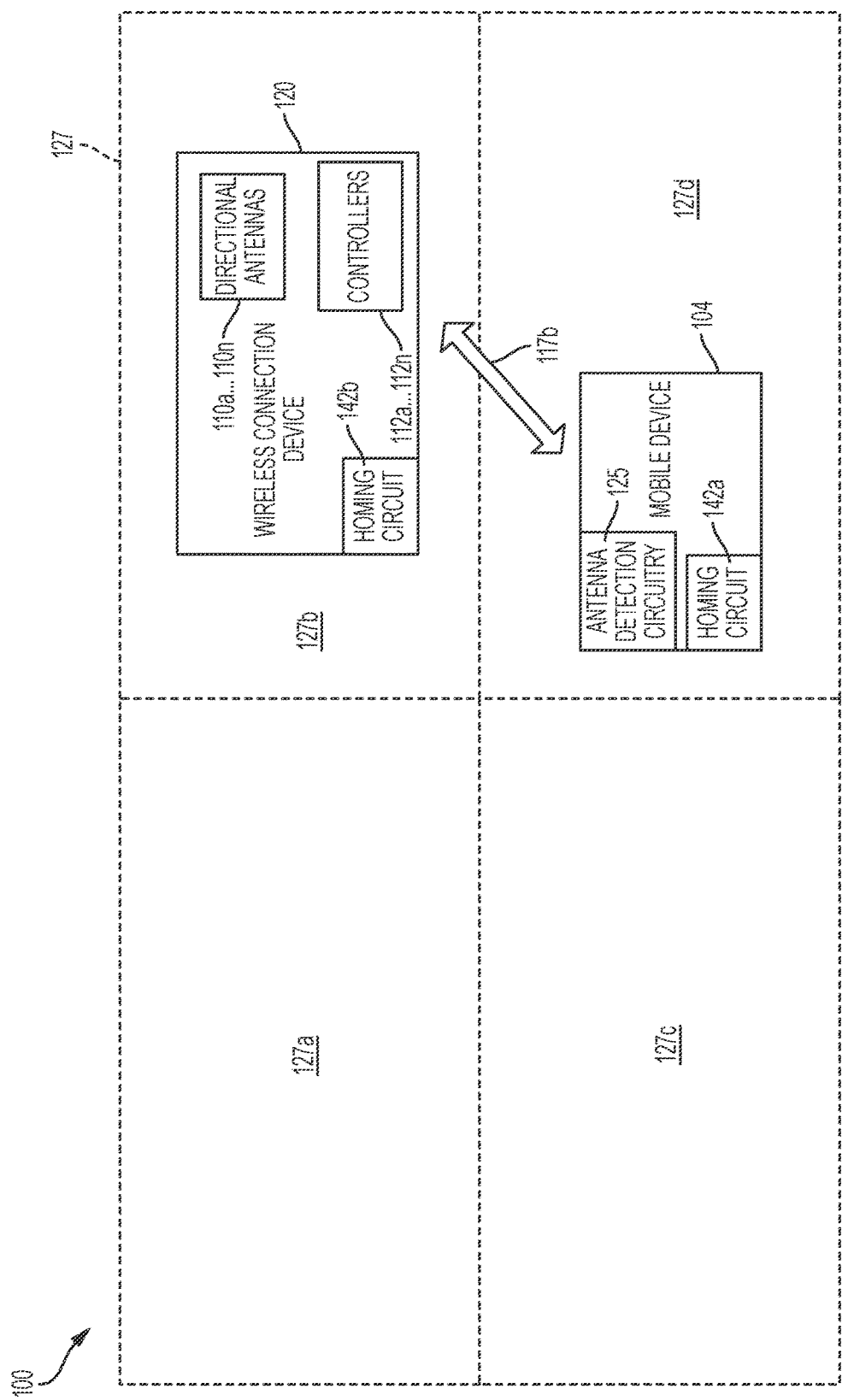
FIG. 2 illustrates the mobile device of FIG. 1 traveling to a differing sub-zone, in accordance with embodiments of the present invention.

FIG. 2 illustrates mobile device 104 of FIG. 1 traveling to a sub-zone 127d, in accordance with embodiments of the present invention. In contrast to FIG. 1, mobile device 104 in FIG. 2 has traveled from sub-zone 127c to sub-zone 127d. In response, antenna detection circuitry 125 automatically disconnects a wireless signal 117b from a first antenna (associated with an optimized connection for sub-zone 127c) of directional antennas 110a . . . 110n and detects a second antenna of directional antennas 110a . . . 110n for an optimized connection within sub-zone 127d and an associated controller of controllers 112a . . . 112n automatically connects wireless signal 117b to the second antenna. Additionally, the first antenna is disabled. Alternatively, the first antenna may be moved (e.g., via a motor) towards a direction of sub-zone 127d for connection to mobile device 104 instead of connection to the second antenna.

Figure 3:
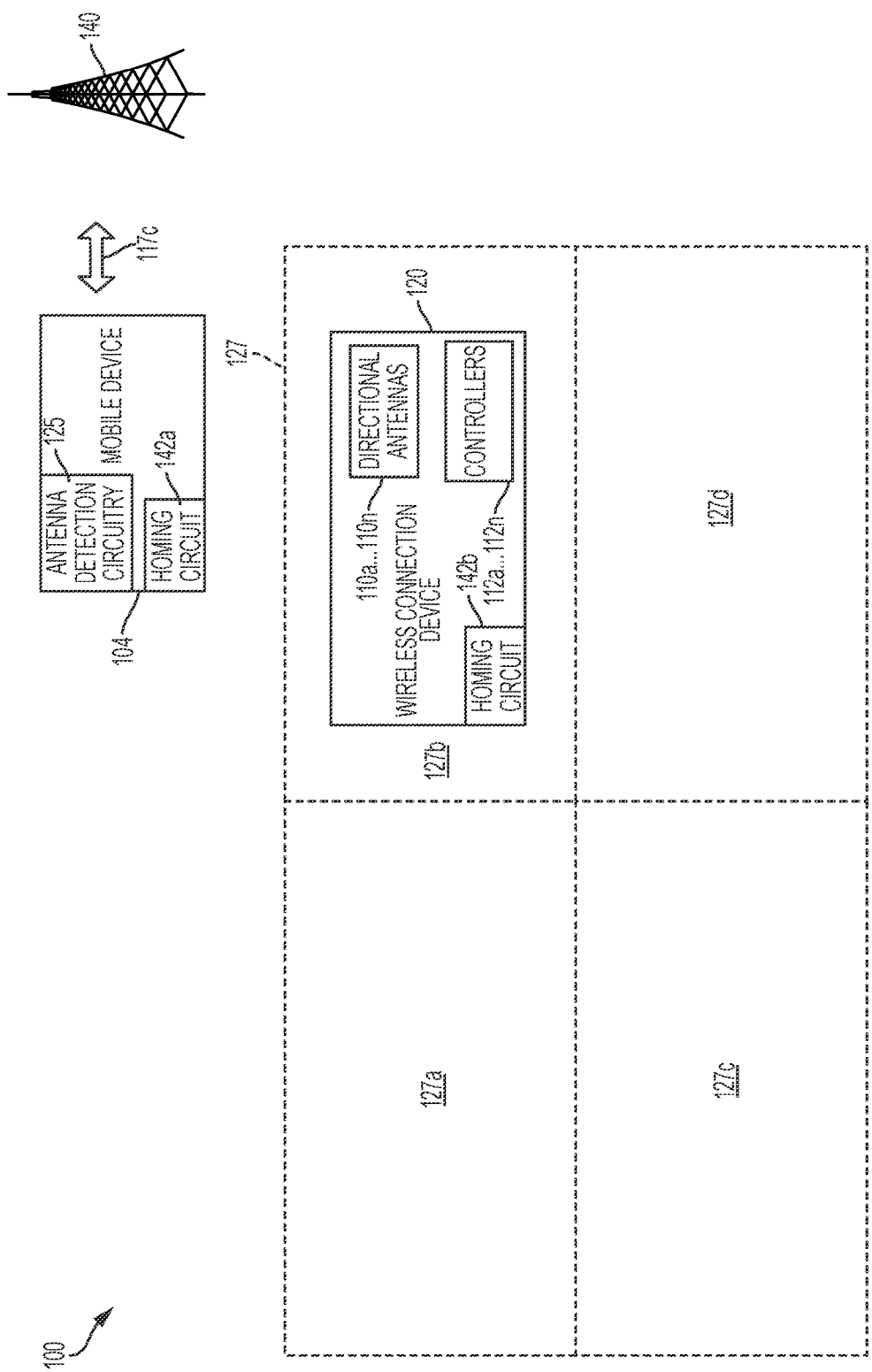
FIG. 3 illustrates the mobile device of FIG. 1 traveling to a location external to the geographical location/structure, in accordance with embodiments of the present invention.

FIG. 3 illustrates mobile device 104 of FIG. 1 traveling to a location external to geographical location/structure 127, in accordance with embodiments of the present invention. In contrast to FIG. 2, mobile device 104 in FIG. 3 has traveled from sub-zone 127d to a location external to geographical location/structure 127. In response, antenna detection circuitry 125 automatically disconnects a wireless signal 117c from the second antenna (associated with an optimized connection for sub-zone 127d) of directional antennas 110a . . . 110n and detects a cellular tower 140 for an optimized connection external to geographical location/structure 127. Wireless signal 117c is automatically connected to cellular tower 140. Additionally, the second antenna is disabled.

Figure 4:
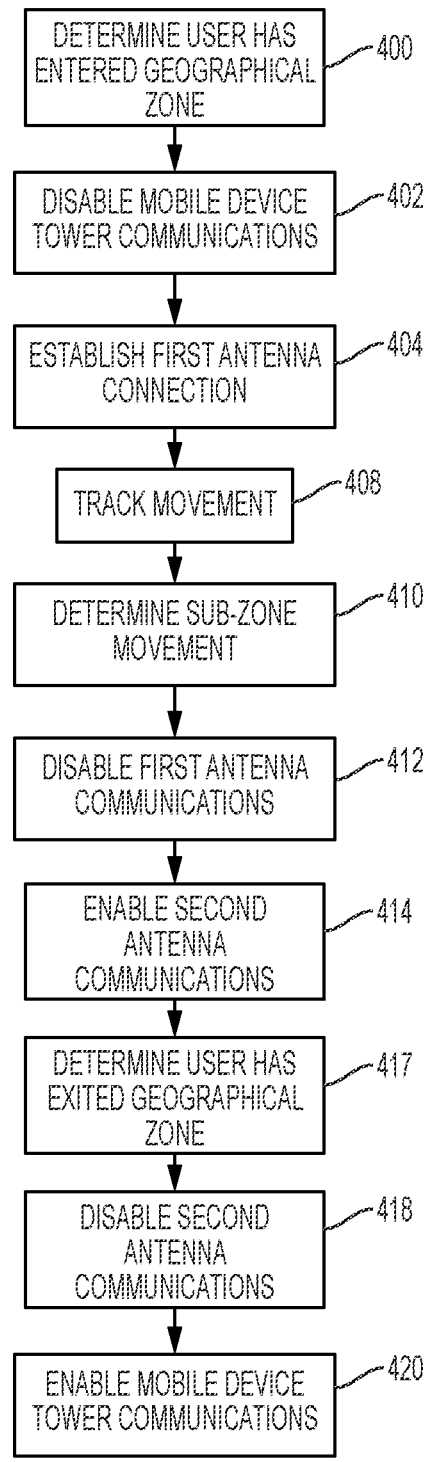
FIG. 4 illustrates an algorithm detailing a process flow enabled by the system of FIG. 1 for improving mobile bandwidth consumption by automatically controlling a direction of directional antennas to enable specified boundaries for wireless communications, in accordance with embodiments of the present invention.

FIG. 4 illustrates an algorithm detailing a process flow enabled by system 100 of FIGS. 1-3 for improving mobile bandwidth consumption by automatically controlling a direction of directional antennas to enable specified boundaries for wireless communications, in accordance with embodiments of the present invention. Each of the steps in the algorithm of FIG. 4 may be enabled and executed in any order by a computer processor(s) executing computer code. Additionally, each of the steps in the algorithm of FIG. 4 may be enabled and executed in combination by mobile device 104 and wireless connection device 120 of FIG. 1. In step 400, it is determined that a mobile device (associated with travel within a vehicle) has exited the vehicle and entered a specified geographical zone (via an antenna detection circuit of the mobile device). In step 402, communications between the mobile device and mobile device tower are disabled. The communications between the mobile device and mobile device tower may be disabled based on determining that the vehicle has been disabled. Alternatively, the communications between the mobile device and mobile device tower may be disabled based on determining that a door of the vehicle has been opened. In step 404, a wireless connection between a mobile device and a first antenna of a wireless connection device located within a specified geographical zone is established. The mobile device comprises an antenna detection circuit. The wireless connection device comprises a plurality of directional antennas (comprising the first antenna) each pointing towards a different direction. In step 408, movement of the mobile device within the specified geographical zone is tracked via the antenna detection circuit. In step 410, it is determined (based on results of the tracking of step 408) that the mobile device has exited a first subzone of the specified geographical zone. The first subzone is associated with communications with the wireless connection device via the first antenna. Additionally, it is determined that the mobile device has entered a second subzone of the specified geographical zone. The second subzone is associated with communications with the wireless connection device via a second antenna of the plurality of directional antennas. In step 412, communications between the mobile device and the wireless connection device are disabled via the first antenna. In step 414, communications between the mobile device and the wireless connection device are enabled via the second antenna. Disabling the communications between the mobile device and the wireless connection device via the first antenna may include automatically moving the first antenna such that the first antenna is directed away a current location of the mobile device. Likewise, enabling the communications between the mobile device and the wireless connection device via the second antenna may include automatically moving the second antenna such that the second antenna is directed towards a current location of the mobile device in the second subzone. Alternatively, disabling the communications between the mobile device and the wireless connection device via the first antenna may include automatically disabling a connection between the first antenna and the wireless communication device. Likewise, enabling the communications between the mobile device and the wireless connection device via the second antenna may include automatically enabling a connection between said second antenna and the wireless communication device. In step 417, it is determined that the mobile device has exited the specified geographical zone. In step 418, communications between the mobile device and the wireless connection device via said second antenna are disabled. In step 420, communications between the mobile device and a mobile device tower in range of the mobile device are established.

Figure 5:
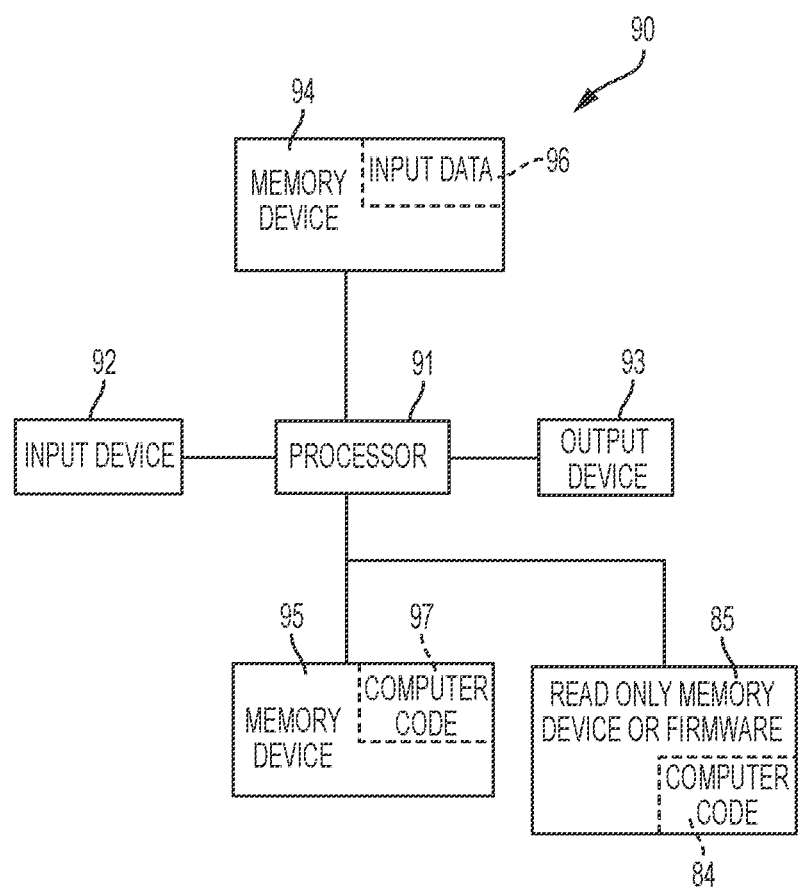
FIG. 5 illustrates a computer system used by the system of FIG. 1 for improving mobile bandwidth consumption by automatically controlling a direction of directional antennas to enable specified boundaries for wireless communications, in accordance with embodiments of the present invention.

FIG. 5 illustrates a computer system 90 (e.g., mobile device 104 and/or wireless connection device 120 of FIG. 1) used by or comprised by the system of FIG. 1 for improving mobile bandwidth consumption by automatically controlling a direction of directional antennas to enable specified boundaries for wireless communications, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for improving mobile bandwidth consumption by automatically controlling a direction of directional antennas to enable specified boundaries for wireless communications. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve mobile bandwidth consumption by automatically controlling a direction of directional antennas to enable specified boundaries for wireless communications. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving mobile bandwidth consumption by automatically controlling a direction of directional antennas to enable specified boundaries for wireless communications. In another embodiment, the invention provides a business method that performs the process steps of the invention on a subscription, advertising, and/or fee basis. That is, a service supplier, such as a Solution Integrator, could offer to enable a process for improving mobile bandwidth consumption by automatically controlling a direction of directional antennas to enable specified boundaries for wireless communications. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
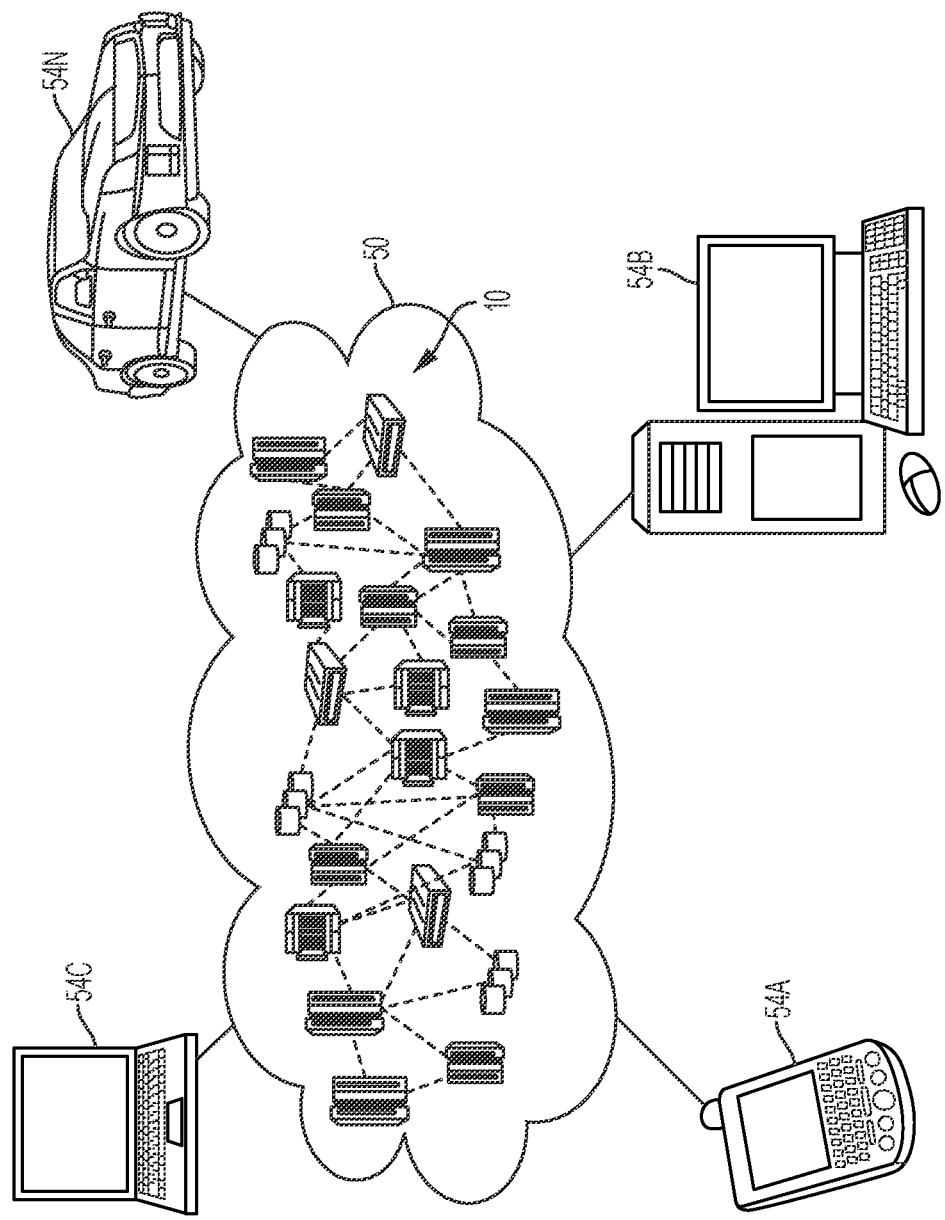
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
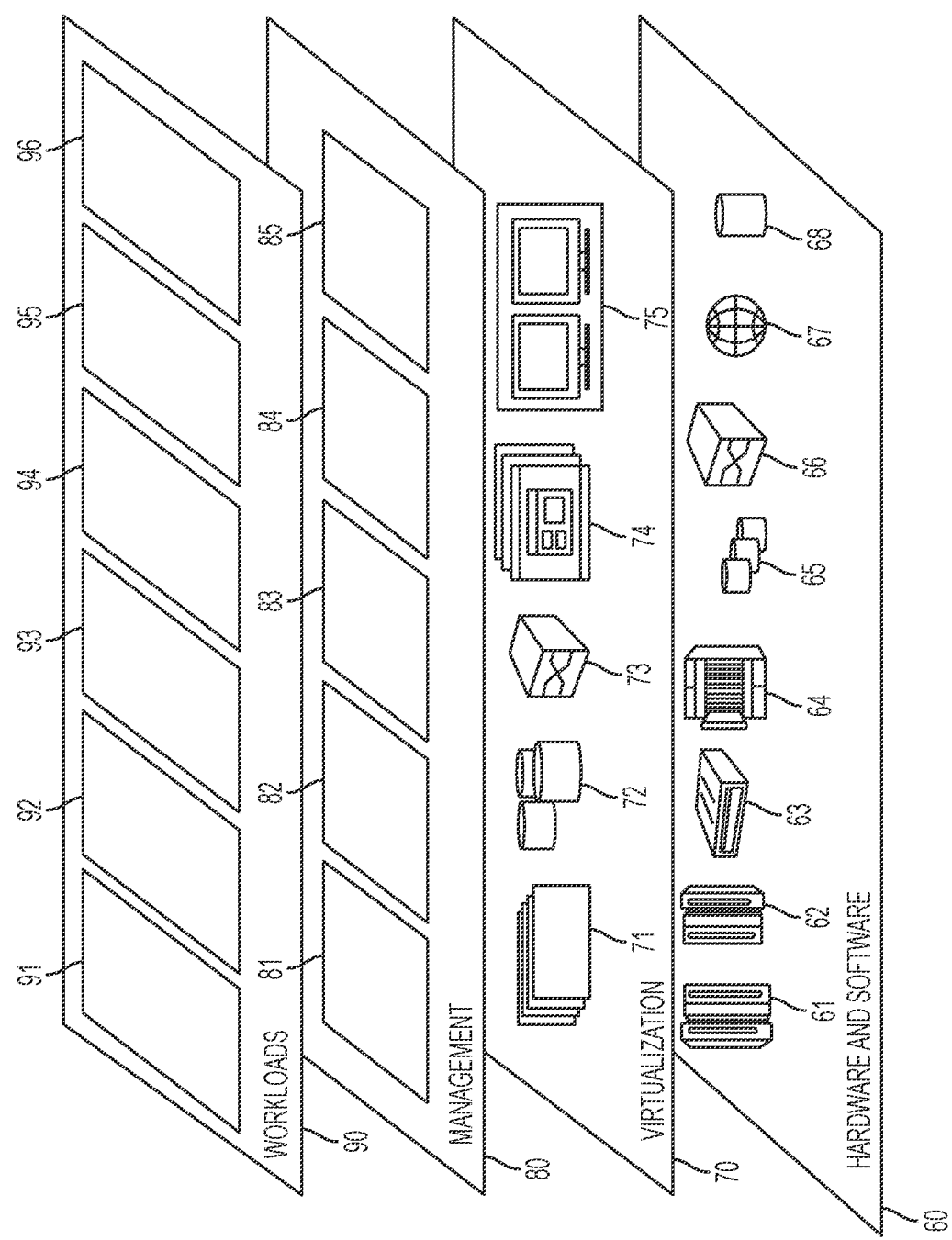
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving mobile bandwidth consumption by automatically controlling a direction of directional antennas to enable specified boundaries for wireless communications 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A mobile bandwidth consumption improvement method comprising:
   establishing, by a processor of a mobile device located within a specified geographical zone, a wireless connection between said mobile device and a first antenna of a wireless connection device located within said specified geographical zone, wherein said mobile device comprises an antenna detection circuit, and wherein said wireless connection device comprises a plurality of directional antennas each pointing towards a different direction, wherein each antenna of said plurality of directional antennas comprises a motor for moving each said antenna, and wherein said plurality of directional antennas comprise said first antenna and a first motor;
   tracking, by said processor via said antenna detection circuit, movement of said mobile device within said specified geographical zone;
   first determining, by said processor based on results of said tracking, that said mobile device has exited a first subzone of said specified geographical zone, wherein said first subzone is associated with communications with said wireless connection device via said first antenna;
   second determining, by said processor based on results of said tracking, that said mobile device has entered a second subzone of said specified geographical zone, wherein said second subzone is associated with communications with said wireless connection device via a second antenna of said plurality of directional antennas;
   disabling, by said processor based on results of said first determining, communications between said mobile device and said wireless connection device via said first antenna, wherein said disabling said communications between said mobile device and said wireless connection device via said first antenna comprises enabling said first motor for automatically moving said first antenna such that said first antenna is directed, via a change in a first angle of azimuth and elevation of said first antenna, away from a current location of said mobile device; and
   enabling, by said processor based on results of said second determining, communications between said mobile device and said wireless connection device via said second antenna; and wherein said enabling said communications between said mobile device and said wireless connection device via said second antenna comprises enabling a second motor for automatically moving said second antenna such that said second antenna is directed, via a change in a second angle of azimuth and elevation of said second antenna, towards a current location of said mobile device in said second subzone.

2. The method of claim 1, wherein said disabling said communications between said mobile device and said wireless connection device via said first antenna further comprises automatically disabling, via a first relay, a connection between said first antenna and said wireless communication device; and wherein said enabling said communications between said mobile device and said wireless connection device via said second antenna further comprises automatically enabling, via a second relay, a connection between said second antenna and said wireless communication device.

3. The method of claim 1, further comprising:
   before said establishing, determining by said processor, that said mobile device has entered said specified geographical zone; and
   disabling by said processor, communications between said mobile device and a mobile device tower.

4. The method of claim 3, wherein said mobile device has exited a vehicle, and wherein said method further comprises:
   before said disabling said communications between said mobile device and said mobile device tower, determining by said processor, that said vehicle has been disabled.

5. The method of claim 3, wherein said mobile device has exited a vehicle, and wherein said method further comprises:
   before said disabling said communications between said mobile device and said mobile device tower, determining by said processor, that a door of said vehicle has been opened.

6. The method of claim 1, further comprising:
   third determining, by said processor based on results of said tracking, that said mobile device has exited said specified geographical zone;
   disabling, by said processor based on results of said third determining, communications between said mobile device and said wireless connection device via said second antenna; and
   enabling, by said processor based on results of said third determining, communications between said mobile device and a mobile device tower in range of said mobile device.

7. The method of claim 1, further comprising:
   providing at least one support service for at least one of creating, integrating, hosting, maintaining, and deploying computer-readable code in the control hardware, said code being executed by the computer processor to implement: said establishing, said tracking, said first determining, said second determining, said disabling, and said enabling.

8. A computer program product, comprising a computer readable hardware storage device storing a computer readable program code, said computer readable program code comprising an algorithm that when executed by a processor of a mobile device implements a mobile bandwidth consumption improvement method, said method comprising:
   establishing, by said processor of said mobile device located within a specified geographical zone, a wireless connection between said mobile device and a first antenna of a wireless connection device located within said specified geographical zone, wherein said mobile device comprises an antenna detection circuit, and wherein said wireless connection device comprises a plurality of directional antennas each pointing towards a different direction, wherein each antenna of said plurality of directional antennas comprises a motor for moving each said antenna, and wherein said plurality of directional antennas comprise said first antenna and a first motor;
   tracking, by said processor via said antenna detection circuit, movement of said mobile device within said specified geographical zone;
   first determining, by said processor based on results of said tracking, that said mobile device has exited a first subzone of said specified geographical zone, wherein said first subzone is associated with communications with said wireless connection device via said first antenna;
   second determining, by said processor based on results of said tracking, that said mobile device has entered a second subzone of said specified geographical zone, wherein said second subzone is associated with communications with said wireless connection device via a second antenna of said plurality of directional antennas;

disabling, by said processor based on results of said first determining, communications between said mobile device and said wireless connection device via said first antenna, wherein said disabling said communications between said mobile device and said wireless connection device via said first antenna comprises enabling said first motor for automatically moving said first antenna such that said first antenna is directed, via a change in a first angle of azimuth and elevation of said first antenna, away from a current location of said mobile device; and enabling, by said processor based on results of said second determining, communications between said mobile device and said wireless connection device via said second antenna; and wherein said enabling said communications between said mobile device and said wireless connection device via said second antenna comprises enabling a second motor for automatically moving said second antenna such that said second antenna is directed, via a change in a second angle of azimuth and elevation of said second antenna, towards a current location of said mobile device in said second subzone.

9. The computer program product of claim 8, wherein said disabling said communications between said mobile device and said wireless connection device via said first antenna further comprises automatically disabling, via a first relay, a connection between said first antenna and said wireless communication device; and wherein said enabling said communications between said mobile device and said wireless connection device via said second antenna further comprises automatically enabling, via a second relay, a connection between said second antenna and said wireless communication device.

10. The computer program product of claim 8, wherein said method further comprises:
before said establishing, determining by said processor, that said mobile device has entered said specified geographical zone; and
disabling by said processor, communications between said mobile device and a mobile device tower.

11. The computer program product of claim 10, wherein said mobile device has exited a vehicle, and wherein said method further comprises:
before said disabling said communications between said mobile device and said mobile device tower, determining by said processor, that said vehicle has been disabled.

12. The computer program product of claim 10, wherein said mobile device has exited a vehicle, and wherein said method further comprises:
before said disabling said communications between said mobile device and said mobile device tower, determining by said processor, that a door of said vehicle has been opened.

13. The computer program product of claim 8, wherein said method further comprises:
third determining, by said processor based on results of said tracking, that said mobile device has exited said specified geographical zone;
disabling, by said processor based on results of said third determining, communications between said mobile device and said wireless connection device via said second antenna; and
enabling, by said processor based on results of said third determining, communications between said mobile device and a mobile device tower in range of said mobile device.

14. A mobile device comprising a processor coupled to a computer-readable memory unit, said memory unit comprising instructions that when executed by the computer processor implements a mobile bandwidth consumption improvement method comprising:
establishing, by said processor of said mobile device located within a specified geographical zone, a wireless connection between said mobile device and a first antenna of a wireless connection device located within said specified geographical zone, wherein said mobile device comprises an antenna detection circuit, and wherein said wireless connection device comprises a plurality of directional antennas each pointing towards a different direction, wherein each antenna of said plurality of directional antennas comprises a motor for moving each said antenna, and wherein said plurality of directional antennas comprise said first antenna and a first motor;
tracking, by said processor via said antenna detection circuit, movement of said mobile device within said specified geographical zone;
first determining, by said processor based on results of said tracking, that said mobile device has exited a first subzone of said specified geographical zone, wherein said first subzone is associated with communications with said wireless connection device via said first antenna;
second determining, by said processor based on results of said tracking, that said mobile device has entered a second subzone of said specified geographical zone, wherein said second subzone is associated with communications with said wireless connection device via a second antenna of said plurality of directional antennas;
disabling, by said processor based on results of said first determining, communications between said mobile device and said wireless connection device via said first antenna, wherein said disabling said communications between said mobile device and said wireless connection device via said first antenna comprises enabling said first motor for automatically moving said first antenna such that said first antenna is directed, via a change in a first angle of azimuth and elevation of said first antenna, away from a current location of said mobile device; and
enabling, by said processor based on results of said second determining, communications between said mobile device and said wireless connection device via said second antenna; and wherein said enabling said communications between said mobile device and said wireless connection device via said second antenna comprises enabling a second motor for automatically moving said second antenna such that said second antenna is directed, via a change in a second angle of azimuth and elevation of said second antenna, towards a current location of said mobile device in said second subzone.

15. The mobile device of claim 14, wherein said disabling said communications between said mobile device and said wireless connection device via said first antenna further comprises automatically disabling, via a first relay, a connection between said first antenna and said wireless communication device; and wherein said enabling said communications between said mobile device and said wireless connection device via said second antenna further comprises automatically enabling, via a second relay, a connection between said second antenna and said wireless communication device.

16. The mobile device of claim 14, wherein said method further comprises:
   before said establishing, determining by said processor, that said mobile device has entered said specified geographical zone; and
   disabling by said processor, communications between said mobile device and a mobile device tower.

17. The mobile device of claim 16, wherein said mobile device has exited a vehicle, and wherein said method further comprises:
   before said disabling said communications between said mobile device and said mobile device tower, determining by said processor, that said vehicle has been disabled.

\* \* \* \* \*